US011373659B2

(12) United States Patent
Kim et al.

(10) Patent No.: US 11,373,659 B2
(45) Date of Patent: Jun. 28, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Kibeom Kim, Suwon-si (KR); Sunmin Kim, Suwon-si (KR); Hoon Heo, Suwon-si (KR); Inwoo Hwang, Suwon-si (KR); Kiwoong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 16/713,109

(22) Filed: Dec. 13, 2019

(65) Prior Publication Data

US 2020/0194009 A1    Jun. 18, 2020

(30) Foreign Application Priority Data

Dec. 14, 2018   (KR) .................. 10-2018-0162230

(51) Int. Cl.
*G10L 19/00*   (2013.01)
*G06N 3/04*   (2006.01)
(Continued)

(52) U.S. Cl.
CPC .............. *G10L 19/00* (2013.01); *G06N 3/04* (2013.01); *G06N 3/08* (2013.01); *G09G 3/22* (2013.01); *H04R 3/00* (2013.01)

(58) Field of Classification Search
CPC ..... G10L 19/00; G10L 21/0316; G10L 25/57; G10L 25/51; G10L 21/0232; G06N 3/04; G06N 3/08; G06N 3/0454; G06N 20/00; G06N 3/063; H04N 5/62; H04N 21/4341; H04N 21/4394; H04N 5/147; H04N 21/4402; H04N 21/8456; H04N 5/91; H04N 21/44008; H04N 21/4307; H04S 7/30; H04R 3/00; G09G 3/22; G06F 3/165

See application file for complete search history.

(56) References Cited

U.S. PATENT DOCUMENTS 9,563,825 B2   2/2017   Shen et al.
9,697,826 B2   7/2017   Sainath et al.
(Continued)

FOREIGN PATENT DOCUMENTS

JP    2001-292491 A    10/2001

OTHER PUBLICATIONS

International Search Report and Written Opinion dated Apr. 8, 2020 issued by the International Searching Authority in International Application No. PCT/KR2019/017383 (PCT/ISA/210 and PCT/ISA/237).

*Primary Examiner* — Yogeshkumar Patel
(74) *Attorney, Agent, or Firm* — Sughrue Mion, PLLC

(57) ABSTRACT

A display apparatus includes a display, an audio outputter, and a processor that divides, into data blocks, a data group having a predetermined number of frames with respect to data of an audio stream input frame by frame; sequentially performs operations using a filter previously learned according to the data blocks; identifies an audio feature according to the data group, based on the sequentially performed operations; and processes the data of the audio stream so that a sound output corresponding to the data group has sound effects corresponding to the identified audio feature.

18 Claims, 11 Drawing Sheets

(51) Int. Cl.
*H04R 3/00* (2006.01)
*G09G 3/22* (2006.01)
*G06N 3/08* (2006.01)

(56) References Cited

U.S. PATENT DOCUMENTS

| | | | |
|---|---|---|---|
| 2007/0286579 A1* | 12/2007 | Murabayashi | H04N 21/4394 386/241 |
| 2011/0071837 A1 | 3/2011 | Yonekubo et al. | |
| 2013/0133013 A1* | 5/2013 | Kang | H04N 21/47205 725/86 |
| 2016/0148078 A1 | 5/2016 | Shen et al. | |
| 2016/0322055 A1 | 11/2016 | Sainath et al. | |
| 2017/0004848 A1 | 1/2017 | Bae et al. | |
| 2017/0287505 A1* | 10/2017 | Jeong | G10L 15/10 |
| 2018/0158463 A1 | 6/2018 | Ge et al. | |
| 2018/0199101 A1* | 7/2018 | Kim | H04N 21/437 |

\* cited by examiner

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2018-0162230, filed on Dec. 14, 2018, in the Korean Intellectual Property Office, the disclosure of which is incorporated by reference herein in its entirety.

BACKGROUND

1. Field

The disclosure relates to a display apparatus and a method of controlling the same, and more particularly to a display apparatus capable of processing an audio signal based on artificial intelligence (AI) learning, a method of controlling the same, and a recording medium thereof.

2. Description of Related Art

An artificial intelligence (AI) system refers to a computer system that has an intellectual ability of a human level, and also refers to a system that becomes smarter through self-machine learning and identification on the contrary to a rule-based smart system. The AI system is more improved in a recognition rate and more accurately learns a user's preference as it is used more and more, and therefore the rule-based smart system has been gradually replaced by the AI system based on AI learning.

AI technology includes machine learning, deep learning and the like learning-based processes, and elementary technologies using the learning.

The learning refers to algorithm technology that autonomously sorts/learns features of input data, and the elementary technology refers technology that uses the machine learning, deep learning and the like learning algorithm to mimic functions of a human brain such as recognition, determination, etc. and is classified into technical fields including language understanding, visual understanding, inference/prediction, knowledge representation, operation control, etc.

Various fields to which the AI technology is applied are as follows. The language understanding refers to technology that recognizes and applies/processes a human language/character, and includes natural language processing, machine translation, a dialog system, question and answer, voice recognition/synthesis, etc. The visual understanding refers to technology that recognizes and processes an object like human vision, and includes object recognition, object tracking, image search, human recognition, scene understanding, space understanding, image enhancement, etc. The inference/prediction refers to technology that and logically makes inference and prediction by identifying and includes knowledge/probability-based inference, optimization prediction, preference-based plan, recommendation, etc. The knowledge representation refers to technology that automatically processes human experience information into knowledge data, and includes knowledge construction (data generation/classification), knowledge management (data utilization), etc. The operation control refers to technology that controls automatic driving of a vehicle and motion of a robot, and includes motion control (e.g. navigation, collision, driving), operation control (e.g. action control), etc.

As interest in the AI technology is rising, this technology has been applied as embedded in a television (TV), a terminal such as a smartphone, and the like products, and attempted to operate in an on-device environment.

However, when the AI technology operates in the on-device environment, operation quantity is restricted by resources as compared with that of the operation performed in a separate server. Accordingly, the operation quantity temporarily increased at a certain point in time may cause a system error due to overload.

SUMMARY

In accordance with an aspect of the disclosure, there is provided a display apparatus including a display configured to display an image; an audio outputter configured to output a sound; and a processor configured to: divide, into data blocks, a data group having a predetermined number of frames with respect to data of an audio stream input frame by frame; sequentially perform operations using a filter previously learned according to the data blocks; identify an audio feature according to the data group, based on the sequentially performed operations; and process the data of the audio stream so that a sound output corresponding to the data group has sound effects corresponding to the identified audio feature.

The operations may be performed while each data block is input.

Each data block may correspond to a division of data of the data group according to time.

Each data block may correspond to a division of data of the data group according to frequency.

The processor may be further configured to sequentially perform the operations according to the data blocks divided from a first data group, and data of an audio stream corresponding to a second data group is input after the first data group.

The processor may be further configured to perform the operations based on a correlation between two or more different divided data blocks among the data blocks of the data group.

The processor is may be configured to merge the data blocks subjected to the operations, and identify the audio feature according to the data group by detecting a pattern of the data group including the merged data blocks.

The processor is may be further configured to detect the pattern of the data group by applying an active function to output data of the data group, and extract a representative value from the output data to which the active function is applied.

The audio feature may correspond to a scene feature of a video corresponding to the data of the audio stream of the data group.

The display apparatus may include a storage configured to store learning data, and the processor may be further configured to perform the operations by applying a deep-learning algorithm model based on the learning data.

In accordance with another aspect of the disclosure, there is provided a method of controlling a display apparatus, including: dividing, into data blocks, a data group having a predetermined number of frames with respect to data of an audio stream input frame by frame; sequentially performing operations using a filter previously learned according to the data blocks; identifying an audio feature according to the data group, based on the sequentially performed operations; and processing the data of the audio stream so that a sound output corresponding to the data group has sound effects corresponding to the identified audio feature.

The operations may be performed while each data block is input.

Each data block may correspond to a division of data of the data group according to time.

Each data block may correspond to a division of data of the data group according to frequency.

The sequential performing of the operations may include sequentially performing the operations according to the data blocks divided from a first data group, and data of an audio stream corresponding to a second data group is input after the first data group.

The sequential performing of the operations may include performing the operations based on a correlation between two or more different divided data blocks among the data blocks of the data group.

The method may further include merging the data blocks subjected to the operations; and identifying the audio feature according to the data group by detecting a pattern of the data group including the merged data blocks.

The identifying of the audio feature may include detecting the pattern of the data group by applying an active function to output data of the data group, and extracting a representative value from the output data to which the active function is applied.

The audio feature may correspond to a scene feature of a video corresponding to the data of the audio stream of the data group.

In accordance with another aspect of the disclosure, there is provided a non-transitory computer program product including: a memory configured to store a plurality of instructions; and a processor configured to execute the instructions to perform: dividing, into data blocks, a data group having a predetermined number of frames with respect to data of an audio stream input frame by frame; sequentially performing operations using a filter previously learned according to the data blocks; identifying an audio feature according to the data group, based on the sequentially performed operations; and processing the data of the audio stream so that a sound output corresponding to the data group has sound effects corresponding to the identified audio feature.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
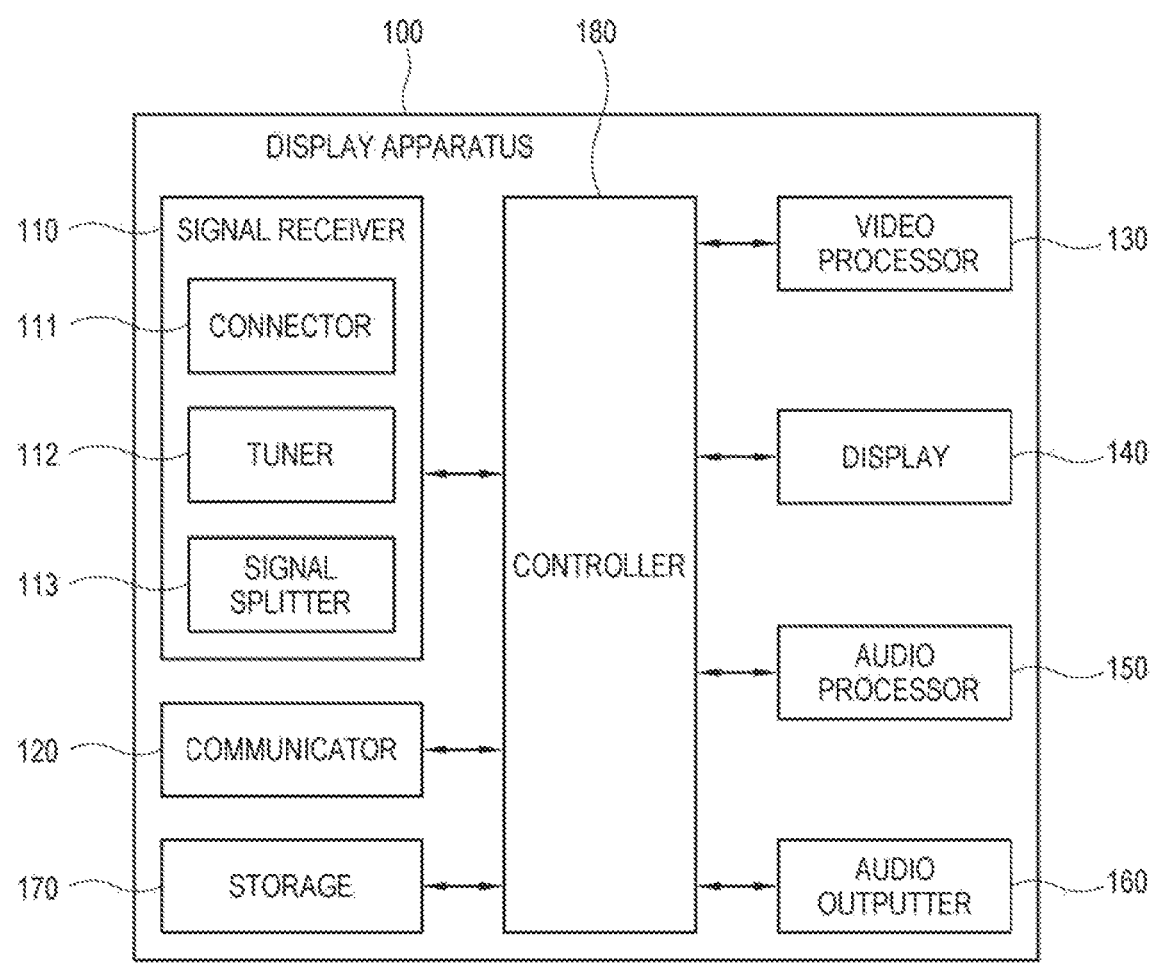
FIG. 1 is a block diagram of a display apparatus according to an embodiment.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the disclosure and the key configurations and functions. In the following descriptions, details about publicly known functions or features will be omitted if it is identified that they cloud the gist of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide a display apparatus and a method of controlling the same, in which distributed processing of operation is possible in processing an audio signal based on artificial intelligence (AI) learning, thereby preventing overload in an on-device environment of restricted resources.

Figure 2:
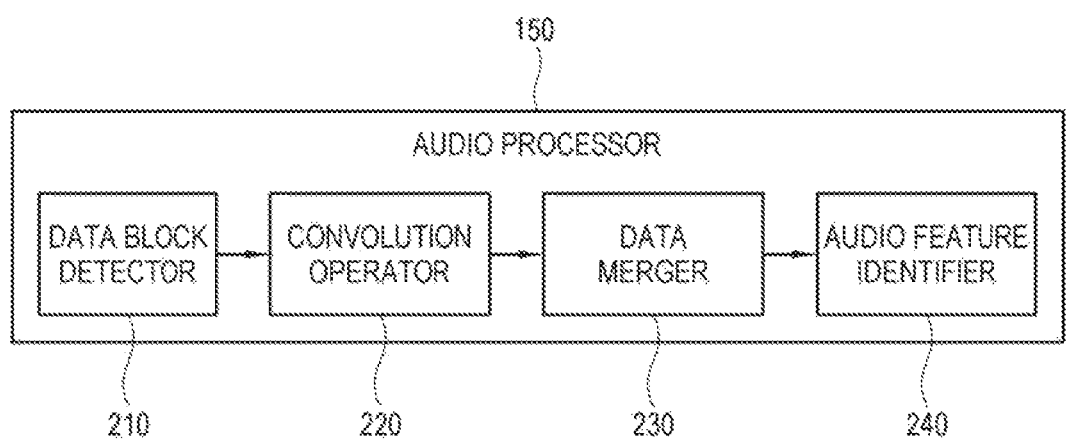
FIG. 2 is a block diagram of an audio processor in a display apparatus according to an embodiment.

FIG. 1 is a block diagram of a display apparatus according to an embodiment. FIG. 2 is a block diagram of an audio processor in a display apparatus according to an embodiment;

A display apparatus 100 according to an embodiment processes an image signal provided from an external signal source, i.e., an image source under a preset process and displays an image based on the processed image signal.

According to an embodiment, the display apparatus 100 may be embodied in a television (TV) that processes a broadcast image based on at least one of a broadcast signal, broadcast information or broadcast data from a transmitter of a broadcasting station.

The display apparatus 100 may for example wirelessly receive a radio frequency (RF) signal, i.e., a broadcast signal from the broadcasting station. To this end, the display apparatus 100 may include an antenna configured to receive a broadcast signal, and a tuner configured to be tuned to a channel corresponding to a broadcast signal.

The display apparatus 100 may receive a broadcast signal through a terrestrial wave, a cable, a satellite, etc., and a signal source is not limited to the broadcasting station. In other words, the signal source may include any apparatus or station capable of transceiving or relaying data, like a set-top box, and a player for reproducing an optical disc such as a Blu-ray disc (BD), a digital versatile disc (DVD), etc.

Standards for a signal received in the display apparatus 100 may be variously given corresponding to the types of the apparatus, and content may for example be received based on a high definition multimedia interface (HDMI), a display port (DP), a digital visual interface (DVI), composite video, component video, super video, Syndicat des Constructeurs d'Appareils Radiorécepteurs et Téléviseurs (SCART), universal serial bus (USB), etc. by a wire.

The display apparatus 100 may receive content from a server or the like through wired or wireless network communication, and there are no limits to the kinds of communication.

According to an embodiment, the display apparatus 100 may perform at least one of wireless communication using an access point (AP) or wireless communication directly connected to other apparatuses without the AP. For example, the display apparatus 100 may receive content from an image source through the wireless network communication such as Wi-Fi, Wi-Fi Direct, Bluetooth, Bluetooth low energy, Zigbee, Ultra-Wideband (UWB), near field communication (NFC), etc.

Alternatively, the display apparatus 100 may receive content through Ethernet or the like wired network communication.

Further, according to an embodiment, the display apparatus 100 may serve as the AP through which various peripheral devices such as a smartphone can perform the wireless communication.

The display apparatus 100 may receive content provided in the form of a file based on real-time streaming through the wired or wireless network.

Further, the display apparatus 100 may perform a signal process to display thereon a moving image, a still image, an application, an on-screen display (OSD), a user interface (UI, hereinafter also referred to as a graphic user interface (GUI)) for various operation controls, etc. based on a signal/data stored in an internal/external storage medium.

According to an embodiment, the display apparatus 100 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

However, the display apparatus 100 of the disclosure is not limited to the TV, and may for example be embodied in the form of a mobile device or a terminal capable of displaying an image and outputting a sound like a smartphone or a smart pad such as a tablet computer.

The display apparatus 100 according to an embodiment may, as shown in FIG. 1, include a signal receiver 110, a communicator 120, a video processor 130, a display 140, an audio processor 150, an audio output unit 160 (e.g., audio outputter), a storage 170, and a controller 180. The signal receiver 110 may include a connector 111, a tuner 112, and a signal splitter 113.

The elements included in the display apparatus 100 are not limited to the foregoing embodiment, but may exclude or change some elements or may include other additional elements.

For example, the display apparatus 100 may further include a user input unit embodied as a keypad (or an input panel) installed in a certain region of the front or lateral side thereof and including with a power key, a menu key and the like button to receive a user's input. According to an embodiment, the user input unit may include an input device (e.g. a remote controller, a mouse, a keyboard, a smartphone installed with an application for remotely controlling the display apparatus 100, etc.) which generates a command/data/information/signal previously set for remotely controlling the display apparatus 100 and transmits it to the display apparatus 100, or a voice input unit such as a microphone which receives a voice/sound uttered by a user. The display apparatus 100 may receive a signal corresponding to a user input from a remote input device through the communicator 120 (to be described later).

The signal receiver 110 receives a signal from the outside. The received signal is split into a video signal and an audio signal by the signal splitter 113, and the video signal and the audio signal are respectively transmitted to and processed by the video processor 130 and the audio processor 150.

The standards of the received signal may be varied depending on the types of the display apparatus 100. For example, the signal receiver 110 may receive a radio frequency (RF) signal from a broadcasting station wirelessly, or may receive a signal complying with standards such as composite video, component video, super video, SCART, HDMI, DP, etc. by a wire.

The signal receiver 110 includes a connector 111 via which the display apparatus 100 connects with the external image source by a wire. According to an embodiment, an HDMI cable is used in connection between the connector 111 and the image source, but the connection standards are not limited to the HDMI.

The display apparatus 100 may receive a signal of content from a set-top box or the like image source connected by a wire through the connector 111. Here, the signal of the content includes a broadcast signal. The connector 111 basically receives a signal from the image source, but may interactively transmit and receive a signal.

The connector 111 may be actualized by a communication circuitry including a data input/output interface where communication modules (an S/W module, a chip, etc.), ports, etc. are combined corresponding to predetermined communication protocols.

According to an embodiment, an apparatus connected to the display apparatus 100 by a wire through the connector 111 is a set-top box or the like image source, but the disclosure is not limited to this embodiment. For example, a display apparatus 100 according to an alternative embodiment may connect with a mobile apparatus by a wire through the connector 111.

According to an embodiment, the signal receiver 110 may include a tuner 112 to be tuned to a channel corresponding to a broadcast signal when the received signal is the broadcast signal. The tuner 112 may include a demodulator that demodulates a broadcast signal of a certain tuned channel and outputs a signal in the form of a transport stream (TS).

In other words, the tuner and the demodulator may be designed as an integrated single chip, or may be embodied as two separate chips, respectively.

According to an embodiment, the signal receiver 110 includes a signal splitter (also referred to as a demultiplexer) 113 to split a broadcast signal into signals such as a video signal, an audio signal, and various pieces of appended data according to features. According to an embodiment, the signal splitter 113 may further split not only the broadcast signal received through the connector 111 and the tuner 112 but also a broadcast signal received through the communicator 120 (to be described later) into the video signal and the audio signal.

According to an embodiment, the audio signal split by the signal splitter 113 may be input to the audio processor 150 in units of frame as data of an audio stream.

According to an embodiment, the display apparatus 100 may receive a signal from various peripheral apparatuses. Further, the signal may be based on data received through the Internet or the like network. In this case, the display apparatus 100 may receive the signal through the communicator 120 (to be described later).

Further, the signal may be based on data stored in a nonvolatile storage 170 such as a flash memory, a hard disk drive (HDD), etc. The storage 170 may be provided inside or outside the display apparatus 100. In a case where the storage 170 is provided outside the display apparatus 100, the storage 170 may be connected to the display apparatus 100 through the connector 111.

The communicator 120 is configured to communicate with at least one external apparatus by a wire or wirelessly. The communicator 120 includes a wired and/or wireless communication module.

The communicator 120 may be actualized by a communication circuitry including communication modules (a S/W module, a chip, etc.) corresponding to predetermined communication protocols.

According to an embodiment, the communicator 120 includes a wireless local area network (WLAN) unit. The WLAN unit may perform wireless communication with at least one external apparatus through an access point (AP) under control of the controller 180. The WLAN unit includes Wi-Fi communication module.

According to an embodiment, the communicator 120 includes at least one of modules for short-range communication such as Bluetooth, Bluetooth low energy, RF communication, Wi-Fi Direct, Zigbee, ultrawideband (UWB), near field communication (NFC), infrared data association (IrDA) communication, etc. The short-range communication module is configured to directly support wireless communication between the display apparatus 100 and at least one external apparatus without the AP.

According to an embodiment, the communicator 120 may further include a wired communication module such as Ethernet, etc.

The communicator 120 of the display apparatus 100 according to an embodiment may be actualized by one among the WLAN unit, the short-range communication module, and the wired communication module or combination of two among them according to required performance.

The video processor (also referred to as an image processor) 130 performs various preset image processing process with regard to a video signal (i.e., an image signal) output from the signal splitter 113. The video processor 130 outputs an output signal, which is generated or combined by performing such an image processing process, to the display 140, so that the display 140 can display an image based on the video signal.

The video processor 130 may include a video decoder for decoding a video signal corresponding to a video format of the display apparatus 100, and a scaler for performing scaling to adjust or convert a video signal corresponding to an output format of the display 140.

The video decoder may for example be an H.264 decoder, but not limited to this example. In other words, the video decoder according to an embodiment may be actualized by decoders complying with various compression standards, such as a moving picture experts group (MPEG) decoder, a high efficiency video codec (HEVC) decoder, etc.

In the display apparatus 100 according to an embodiment, the scaler may be embodied by a resolution increasing module, i.e., a scaling-up module, to increase a resolution of a video, i.e., an image. In other words, the scaler may generate a high-resolution image or a super resolution image from a low-resolution image by up-scaling.

According to an embodiment, the scaler may be embodied by an AI scaler that scales up a video signal decoded by the video decoder through a predetermined AI learning-based process. Here, the AI scaler may be configured to scale up a video signal in accordance with an AI learning-based process used at the encoding terminal of the signal source, i.e., the content providing apparatus.

According to an embodiment, the video processor 130 may further include at least one of a pre-processing module for pre-processing a video signal output from the video decoder to be delivered to the AI scaler, or a post-processing module for post-processing the video signal output from the AI scaler for enhancing image quality.

According to an embodiment, the AI scaler may be configured to process a video signal based on a predetermined learning-based process, for example, machine-learning or deep learning, thereby adjusting a resolution of a video (or image).

There are no limits to the kinds of processes performed by the video processor 130 in the display apparatus 100, and the video processor 130 may for example further include at least one module for performing various processes such as de-interlacing for converting an interlaced type broadcast signal into a progressive type broadcast signal, noise reduction for enhancing image quality, detail enhancement, frame refresh rate conversion, line scanning, etc.

The video processor 130 may be actualized in the form of a group of individual elements, i.e., modules for independently performing such processes, or may be actualized as included in a main system-on-chip (SoC) where many functions are integrated. The main SoC may further include at least one of the audio processor 150 (to be described later), and a microprocessor or a central processing unit (CPU) embodied as an example of the controller 180.

According to an embodiment, the video processor 130 may be actualized by an image board that various chipsets, a memory, electronic parts, wiring, and the like circuit configuration for performing such processes are mounted to a printed circuit board (PCB). In this case, the display apparatus 100 may include a single image board on which the tuner, the video processor 130, and the controller 180 are provided. Of course, this is merely an example. Alternatively, the tuner, the video processor, and the controller may be provided on a plurality of PCBs connected for communication with each other.

The video signal processed by the video processor 130 is output to the display 140. The display 140 displays a video (or image) corresponding to a video signal received from the video processor 130.

There are no limits to the type of the display 140. For example, the display 140 may be achieved by various display types such as liquid crystal, plasma, a light-emitting diode, an organic light-emitting diode, a surface-conduction electron-emitter, a carbon nano-tube, nano-crystal, etc. According to an embodiment, the display 140 includes a display panel for displaying an image, and may further include an additional configuration, e.g. a driver according to the types.

The audio processor 150 processes an audio signal (also referred to as an acoustic signal or a sound signal). The audio processor 150 may be embodied as a digital signal processor (DSP) or the like microprocessor.

The audio processor 150 may receive an audio signal, i.e., audio stream data split by the signal splitter 113, in units of frame.

According to an embodiment, the audio processor 150 may set one data group with data input corresponding to a preset number of consecutive frames which have similar or common audio features (or attributes) with respect to data of an audio stream.

Here, the audio features (or attributes) may correspond to scene features of an image (or video) corresponding to the data of the audio stream. The scene features may for example include a human voice, music, sound effects, racing, etc., and the audio features of the disclosure may be variously distinguishable without being limited to such listed scene features.

In the display apparatus 100 according to an embodiment, seven frames are set as one data group, and each frame has a length of about 5.3 ms. However, the disclosure is not limited to the foregoing embodiment, and therefore the number of frames to be set as one data group may be varied depending on the output audio features, environments where the display apparatus 100 is installed, etc.

According to an embodiment, the audio processor 150 may, as shown in FIG. 2, include a data block detector 210, a convolution operator 220, a data merger 230, and an audio feature identifier 240. Here, the configurations 210, 220, 230 and 240 of the audio processor 150 may for example be distinguished by operations based on execution of software.

The data block detector 210 detects data, i.e., a data block divided from a data group for a preset number of frames, with respect to data of an audio stream input in units of frame.

According to an embodiment, the data detected from the data group may be configured with data blocks obtained by distinguishing (or dividing) the whole data of each data group according to time.

Alternatively, the data detected from the data group may be configured with data blocks obtained by distinguishing (or dividing) the whole data of each data group according to frequencies.

The convolution operator 220 makes the data (i.e., data blocks) divided from one data group be sequentially subjected to operation using a previously learned filter, i.e., convolution. Here, the filter includes a feature analysis filter for identifying the features of the audio stream.

The data merger 230 merges, i.e., stacks the data blocks sequentially subjected to the operation according to the data groups.

The audio feature identifier 240 detects a pattern (or signal pattern) of the data group including the merged data blocks, and identifies the audio features corresponding to the detected pattern.

Detailed embodiments where the audio processor 150 detects data divided from the data group and applies the operation to each piece of detected data will be described later with reference to FIGS. 3 to 11.

The audio processor 150 processes the data of the audio stream so that a sound output corresponding to each data group can have a sound effect corresponding to the audio features identified as above. Thus, the operation is distributed and performed according to the divided data blocks to naturally decrease the peak operation quantity, thereby preventing temporary overload.

The audio output unit 160 outputs a sound based on an audio signal processed in the audio processor 150, i.e., data of an audio stream processed to have sound effects corresponding to the audio features identified according to the data groups.

The audio output unit 160 may be embodied by one or more loudspeakers capable of outputting an audio (or sound). According to an embodiment, the audio output unit 160 may include a plurality of loudspeakers corresponding to a plurality of channels (for example, left and right channels). Alternatively, the audio output unit 160 may be embodied by a sound bar-type loudspeaker installed below the TV embodied as the display apparatus 100 according to the disclosure.

Further, the display apparatus 100 may connect with a separate loudspeaker system through either of the connector 111 or the communicator 120. In this case, the audio signal processed by the audio processor 150 is transmitted through the connector 111 or the communicator 120, thereby outputting a corresponding sound through the corresponding loudspeaker.

The storage 170 may be configured to store various pieces of data of the display apparatus 100. The storage 170 may be actualized by a nonvolatile memory (or a writable ROM) which can retain data even though the display apparatus 100 is powered off, and mirror changes. That is, the storage 170 may include at least one among a hard disk drive (HDD), a flash memory, an electrically programmable ROM (EPROM) or an electrically erasable and programmable ROM (EEPROM).

The storage 170 may further include a volatile memory such as a random access memory (RAM), and the volatile memory may be provided as a dynamic RAM (DRAM) or static RAM (SRAM), of which reading or writing speed for the display apparatus 100 is faster than that of the nonvolatile memory. In other words, a term 'storage' in the disclosure is defined to include not only the nonvolatile memory but also the volatile memory, a cache memory provided in the controller 180, etc.

Data stored in the storage 170 may for example include not only an operating system (OS) for driving the display apparatus 100 but also various applications, image data, appended data, etc. executable on the OS.

Specifically, the storage 170 may be configured to store a signal or data input/output corresponding to operation of elements under control of the controller 180. The storage 170 may be configured to store a program for controlling the display apparatus 100, a UI related to an application provided by a manufacturer or downloaded from the outside, images for providing the UI, user information, documents, databases, or relevant data. Here, the application stored in the storage 170 may include a deep-learning application that operates based on a previously performed learning.

According to an embodiment, the storage 170 is configured to further include learning data so that the audio processor 15 can perform the operation using the previously learned filters according to the data blocks. The audio processor 150 may use a deep-learning algorithm model based on the learning data stored in the storage 170 to carry out the operation to each data group. Here, the operation may employ a deep-learning algorithm based on a convolution neural networks (CNN) having a multi-layer perception (MLP) structure.

The display apparatus 100 according to an embodiment is embodied to operate as AI in an on-device environment, thereby carrying out learning based on the data of the storage 170 autonomously embedded in the apparatus ad the operation using the algorithm model corresponding to the learning. Thus, it is possible to process an audio signal through AI learning in the on-device environment.

Further, the storage 170 is configured to further store pattern information for identifying the audio features according to the data groups.

The controller 180 performs control to operate general elements of the display apparatus 100. The controller 180 includes at least one universal processor that loads at least a part of a control program from a nonvolatile memory, in which a control program is installed, to a volatile memory, and executes the loaded control program, and may for example be embodied by a CPU, an application processor (AP), or a microprocessor.

The controller 180 may include at least one processor with one or more cores among a single core, a dual core, a triple core, a quad core, or the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus.

According to an embodiment, the controller 180 may further include a graphic processing unit (GPU) for graphic-processing.

According to an embodiment, the controller 180 may be embodied as included in the main SoC mounted to the PCB internally provided in the display apparatus 100. Alternatively, the main SoC may further include the video processor 130 for processing a video signal, or the audio processor 150 for processing an audio signal.

The control program may include a program(s) achieved by at least one of a basic input/output system (BIOS), a device driver, an OS, a firmware, a platform, or an application. According to an embodiment, the application may be previously installed or stored in the display apparatus 100 when the display apparatus 100 is manufactured, or may be installed in the display apparatus 100 on the basis of application data received from the outside when it is required in the future. The application data may for example be downloaded from an external server such as an application market to the display apparatus 100. Such an external server is merely an example of the computer program product according to the disclosure, but not limited thereto.

According to an embodiment, the operation of the controller 180 may be actualized by a computer program stored in the computer program product provided separately from the display apparatus 100.

In this case, the computer program product includes a memory in which an instruction corresponding to a computer program is stored, and a processor. When the instruction is issued by the processor, the operations are sequentially performed using the filters previously learned according to the data (i.e., data blocks) divided from the data group for a predetermined number of frames with respect to the data of the audio stream input in units of frame; the audio features are identified according to the data groups based on the sequentially performed operations; and the data of the audio stream is processed a sound output corresponding to each data group can have sound effects corresponding to the identified audio features. Here, the processor issuing the instruction may include the processor (e.g. the CPU) of the controller 180 or the audio processor 150.

That is, according to an embodiment, the audio processor 150 given as the hardware configurations processes the data of the audio stream by way of example. However, the disclosure is not limited to this embodiment. In other words, according to an embodiment, the data of the audio stream may be processed by the software configuration of the controller 180. Likewise, according to an embodiment, at least a part of the operation of the video processor 150 may be controlled by the software configuration of the controller 180.

Accordingly, the display apparatus 100 downloads and executes the computer program stored in a separate computer program product and performs the operation of at least one among the controller 180, the audio processor 150 or the video processor 130.

Further, according to an embodiment, the operation of the controller 180 may be carried out by a computer-readable program stored in the recording medium. The program, i.e., data stored in the recording medium may be directly accessed and executed by the controller 180, or downloaded into the display apparatus 100 via a transmission medium actualized by a wired/wireless network in which the computer systems are connected to one another and executed, thereby carrying out operation.

At least one among the foregoing elements involved in the controller 170 may be actualized by a hardware module or a computer program described as above. Below, it will be described by way of example that the operations of processing the data of the audio stream are carried out by the audio processor 150 of the display apparatus 100. However, it will be appreciated that such operations are carried out by the processor of the controller 180 such as the CPU or by combination of the audio processor 150 and the processor of the controller 180 as necessary.

Below, a procedure of processing an audio signal based on AI-learning performed according to an embodiment will be described with reference to the accompanying drawings.

Figure 3:
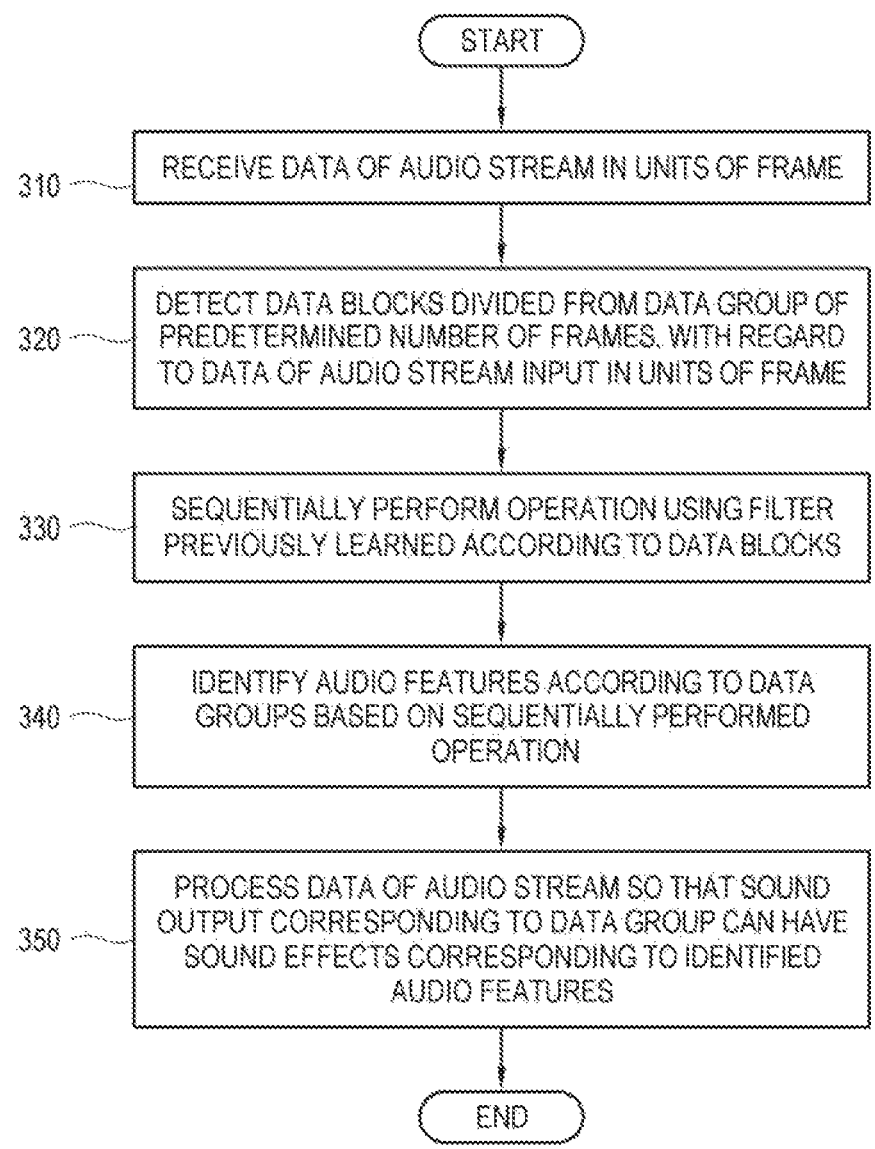
FIG. 3 is a flowchart showing a method of controlling a display apparatus according to an embodiment.

FIG. 3 is a flowchart showing a method of controlling a display apparatus according to an embodiment.

As shown in FIG. 3, data of an audio stream, i.e., an audio signal split in the signal splitter 113 is input to, i.e., received in the audio processor 150 of the display apparatus 100 in units of frame (310).

Figure 4:
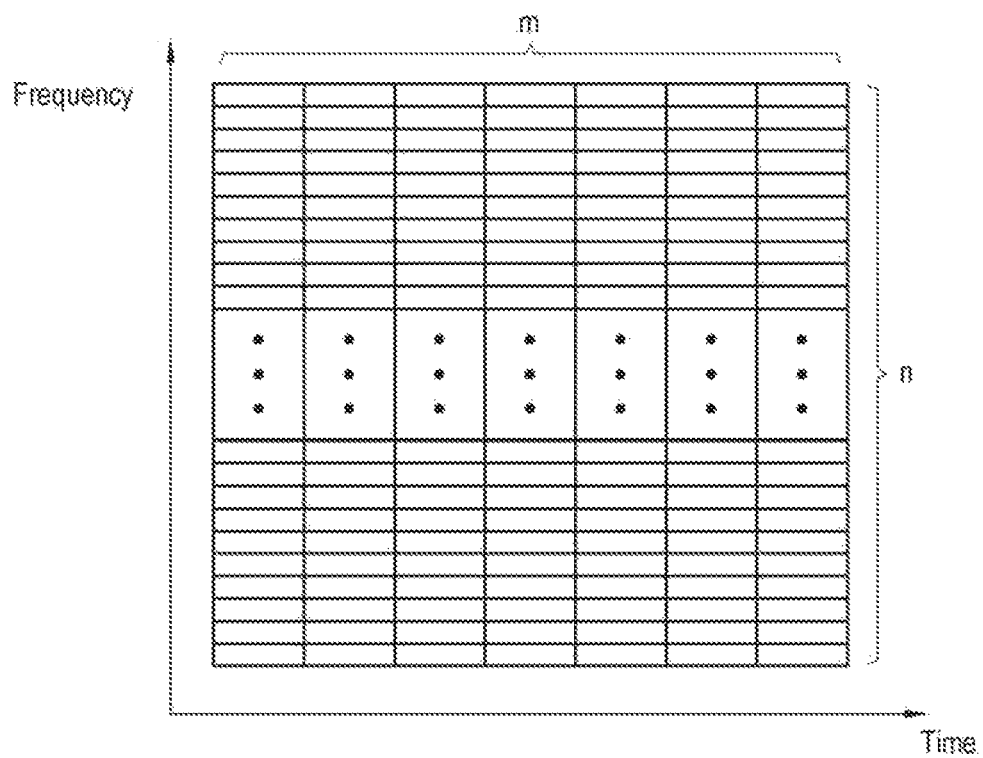
FIG. 4 illustrates data of an audio stream input to an audio processor in a display apparatus according to an embodiment.

FIG. 4 illustrates data of an audio stream input to an audio processor in a display apparatus according to an embodiment;

As shown in FIG. 4, the data of the audio stream input to the audio processor 150 is configured as a two-dimensional (2D) image in the form of a matrix of m×n. In FIG. 4, the abscissa (X axis) indicates a time domain, and the ordinate (Y axis) indicates a frequency domain.

FIG. 4 shows the data of the audio stream set as one data group, and there are no limits to the size of data. According to an embodiment, the data is given having the size corresponding to a matrix of 7×257. In other words, an input audio stream of one data group has a frequency range of 1~257, and corresponds to data input for seven consecutive frames.

The audio processor 150 detects a plurality of data blocks divided from the data group for a predetermined number of frames, with respect to the data of the audio stream input in units of frame (320). Here, 'for the predetermined number of frames' refers to time for which seven frames, for example, from the first frame to the seventh frame or from the eighth frame to the fourteenth frame, are consecutively input/received. The audio processor 150 may detect the plurality of data blocks divided with reference to a predetermined criterion from the data of the audio stream of each data group set corresponding to the time for which the preset number of frames is consecutively input as described above.

Figure 5:
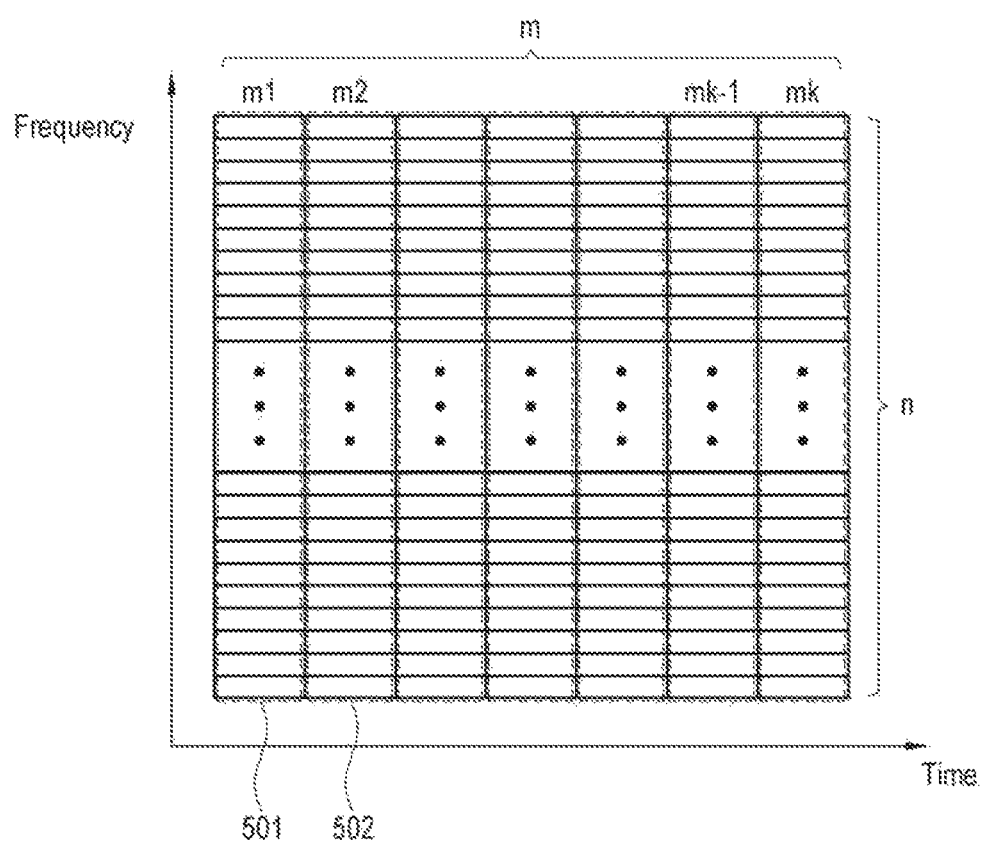
FIG. 5 illustrates that divided data blocks are detected in a display apparatus according to an embodiment.
Figure 6:
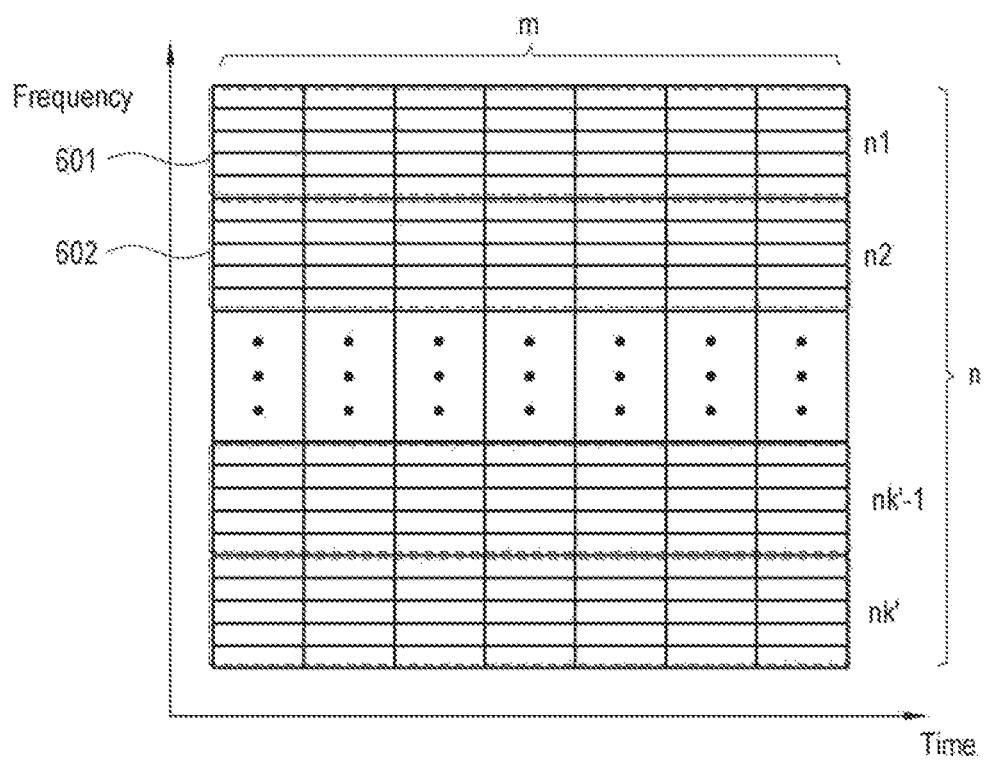
FIG. 6 illustrates that divided data blocks are detected in a display apparatus according to an embodiment.

FIGS. 5 and 6 illustrate that divided data blocks are detected in a display apparatus according to an embodiment.

According to an embodiment, data blocks 501 and 502 detected from the data group may, as shown in FIG. 5, be obtained by distinguishing (or dividing) the whole data of the audio stream of the data group in the time domain.

Specifically, the audio processor 150 may divide the data of the audio stream of each data group into k data blocks of $m_i \times n$ (where, i=1~k).

According to an embodiment, when the data of one data group is given in the form of a matrix of 7×256, seven data blocks 501, 502 may, as shown in FIG. 5, be obtained by dividing the data of the audio stream with respect to the time domain, i.e., the abscissa (X axis), and the number of divided data blocks 501 may correspond to the number of frames of the data group that constitutes the audio stream.

Because the audio processor 150 sequentially receives the audio stream in units of frame, the audio processor 150 can detect the data block corresponding to the frame in real time per frame receiving the audio stream in a case that the data block is divided in a time domain according to an embodiment. Thus, it is possible to perform the distributed operations in real time while receiving the audio stream.

In other words, in the case of the input division in the time domain, the data block is immediately detected per frame of the audio stream without having to wait until the data of the data group is fully received.

Alternatively, data blocks 601 and 602 detected from the data group may, as shown in FIG. 6, be obtained by distinguishing (or dividing) the whole data of the audio stream of the data group in the frequency domain.

Specifically, the audio processor 150 may divide the data of the audio stream of each data group into k' data blocks of $m \times n_i$ (where, i=1~k'). Here, when the data of one data group is given in the form of a matrix of 7×256, five data blocks 601, 602 may, as shown in FIG. 6, be obtained by dividing the data of the audio stream with respect to the frequency domain, i.e., the ordinate (Y axis), and each data group including the divided data blocks is configured to have the number of steps of '50+50+50+50+57=257' in the ordinate.

In an embodiment where the data blocks are divided in the frequency domain, the audio processor 150 can detect the data blocks by dividing the received data into the plurality of data blocks after the data of the audio stream of one data group is fully received. Thus, the data blocks are identified and a correlation between two or more different data blocks is calculated in the state that the data of the audio stream of each data group is fully secured, thereby meeting with a highly reliably operation result without lowering accuracy.

In other words, in the case of the input division in the frequency domain, the data block divided from the data group is detected after the whole data of the data group is received.

The audio processor 150 makes the data blocks divided from the data group in the operation 320 be sequentially subjected to the operations using the previously learned filters (330). Here, the audio processor 150 performs convolution based on the correlation between two or more different data blocks in one data group.

Figure 7:
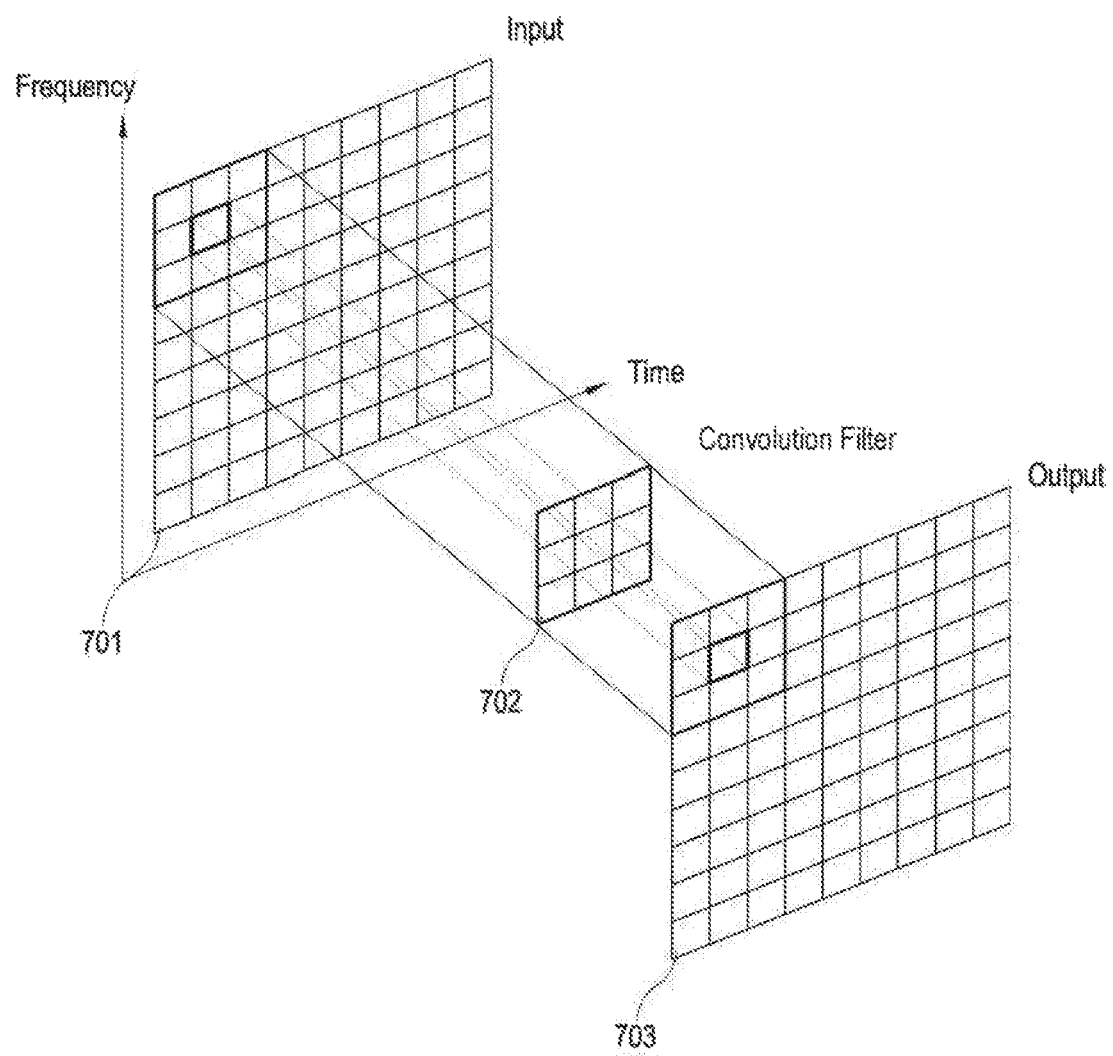
FIG. 7 conceptually illustrates convolution performed according to data blocks in a display apparatus according to an embodiment.

FIG. 7 conceptually illustrates convolution performed according to data blocks in a display apparatus according to an embodiment.

The convolution is to extract image features of each data block by applying one or more filters to input data in the CNN.

The filter is defined as a common parameter for finding out the features of the image, and is also called a 'kernel'. The filter may for example be defined as a square matrix of 7×7 or 3×3, and an object to be learned in the CNN is used as a filter parameter.

As shown in FIG. 7, a filter (e.g. a convolution filter) 702 performs the convolution (i.e., circular convolution) while input data (or an input) 701 corresponding to one divided data block (for example, '601' in FIG. 6) is moved as much as a designated space (for example, by one step or two steps), and extracts a feature map corresponding to the sum of convolutions, thereby outputting an output data (or an output) 703.

In the display apparatus 100 according to an embodiment, the audio processor 150 makes the convolution for the data of the audio stream of each data group in the operation 330 be distributed and performed in sequence according to the divided data blocks.

Figure 8:
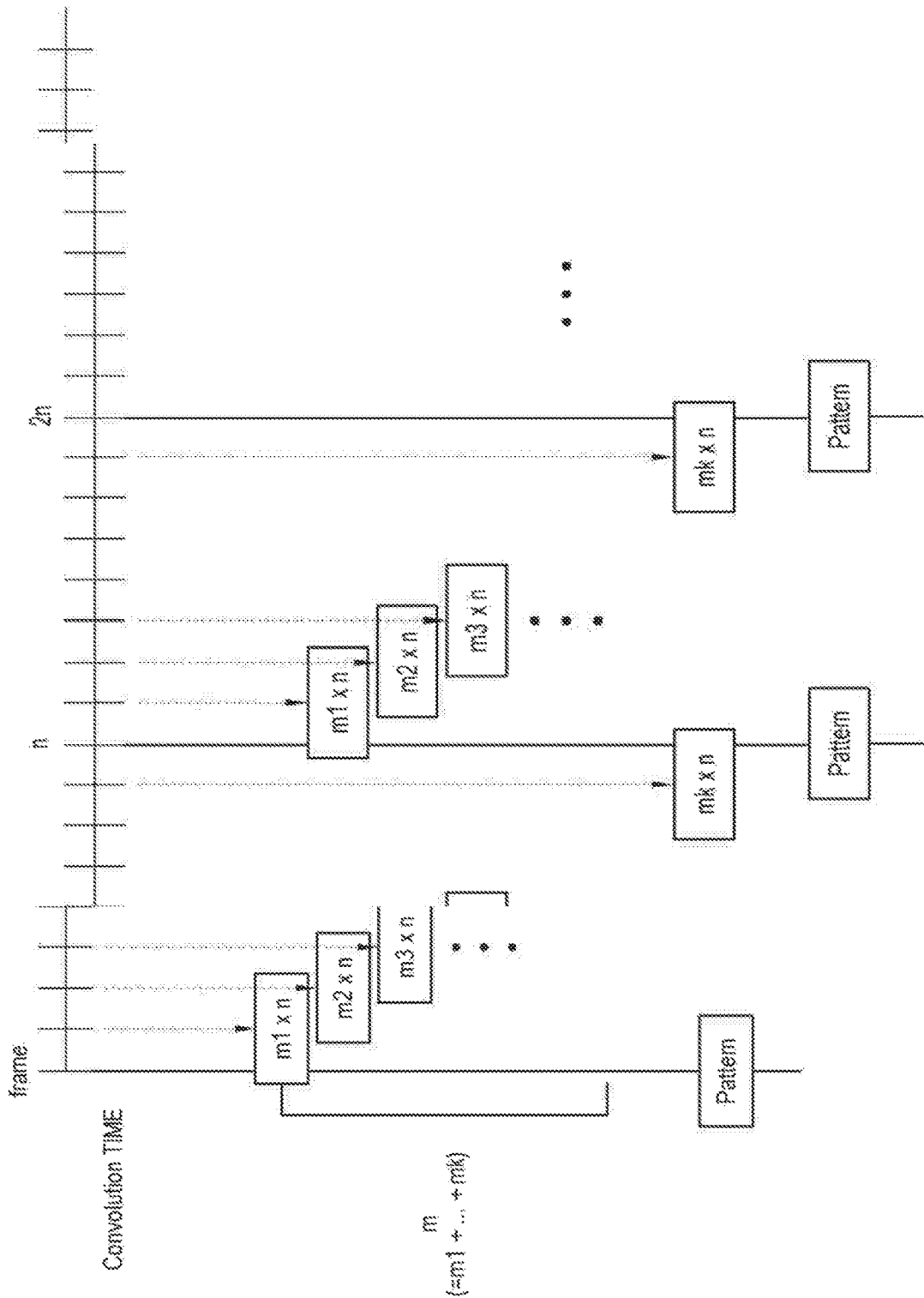
FIG. 8 conceptually illustrates distributed convolution performed in a display apparatus according to an embodiment.
Figure 9:
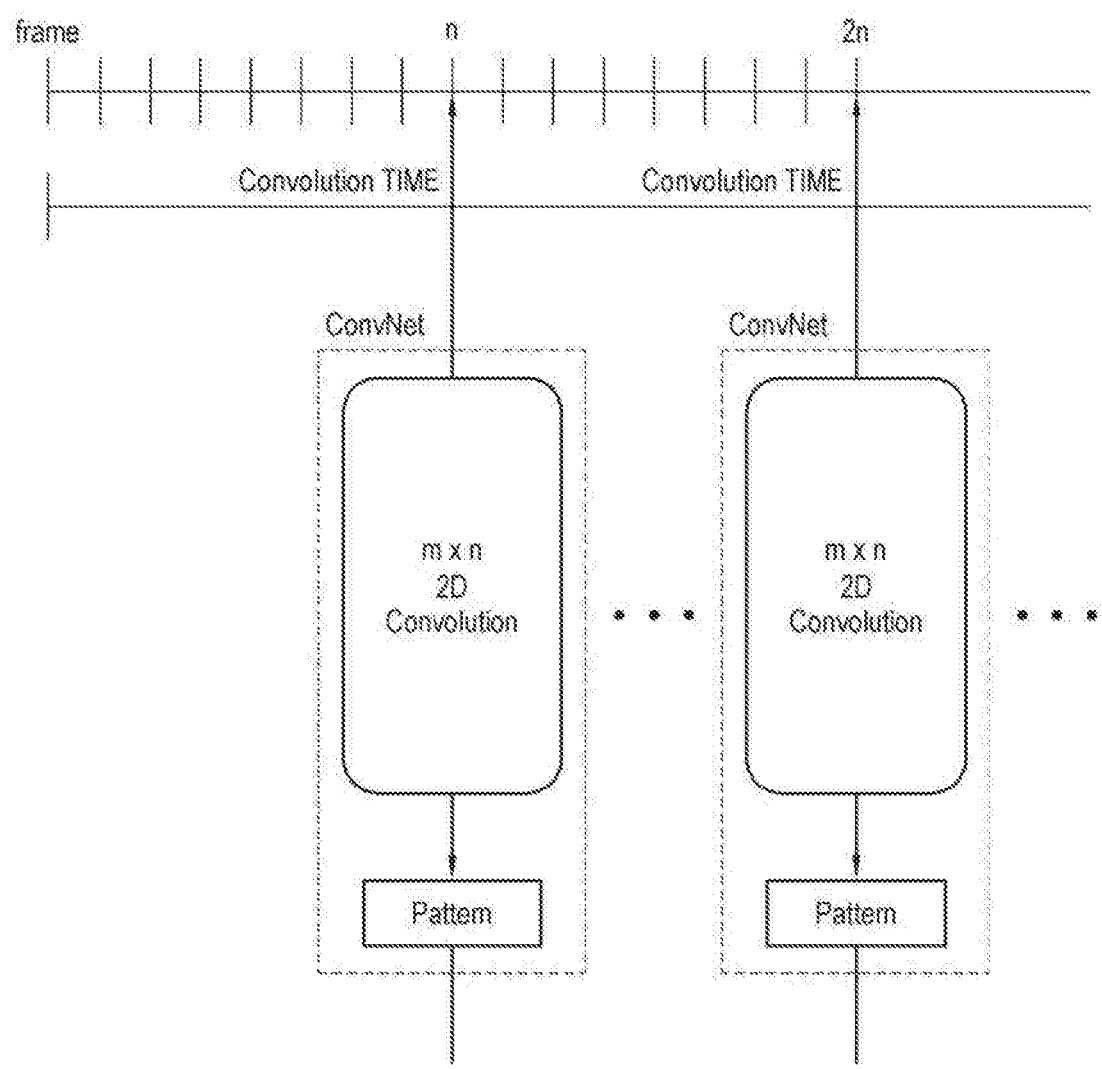
FIG. 9 conceptually illustrates non-distributed convolution.

FIG. 8 conceptually illustrates distributed convolution performed in a display apparatus according to an embodiment, and FIG. 9 conceptually illustrates non-distributed convolution.

As shown in FIG. 8, when the data of the audio stream of one data group is divided into k data blocks of $m_i \times n$ (i=1~k), the audio processor 150 makes the divided data blocks $m_1 \times n$, $m_2 \times n$, $m_3 \times n$, . . . , $m_k \times n$ be sequentially subjected to the convolution. Here, the audio processor 150 performs the convolutions in sequence with regard to the data blocks $m_1 \times n$, $m_2 \times n$, $m_3 \times n$, . . . , $m_k \times n$ at every frame (1~n) in which the data of the audio stream is received.

On the other hand, referring to FIG. 9, the whole data of the input data group is subjected to the convolution at a point in time (n) when the data of the audio stream of one data group of m×n is fully received in units of frame.

That is, in a case shown in FIG. 9, even though the audio stream is received in units of frame, the convolution is not performed until data corresponding to n frames set as one group is fully received. Therefore, when operation quantity suddenly increases in a certain data group, overload may temporarily occur and therefore an error may be caused in an audio process for which a real-time process is important.

Therefore, in the display apparatus according to an embodiment, as shown in FIG. 8, the convolution is distributed and performed at every frame while the data of the audio stream is received in units of frame, thereby preventing overload due to temporary increase in operation quantity.

Figure 10:
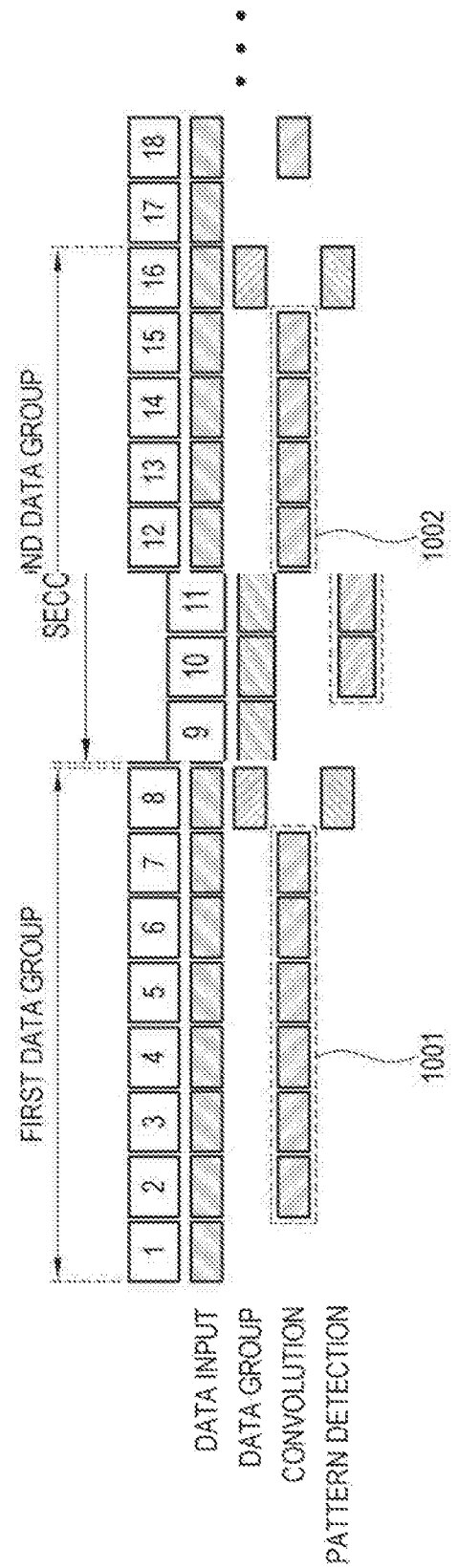
FIG. 10 illustrates that the distributed convolution is performed when data of a data group is divided in a time domain according to an embodiment.
Figure 11:
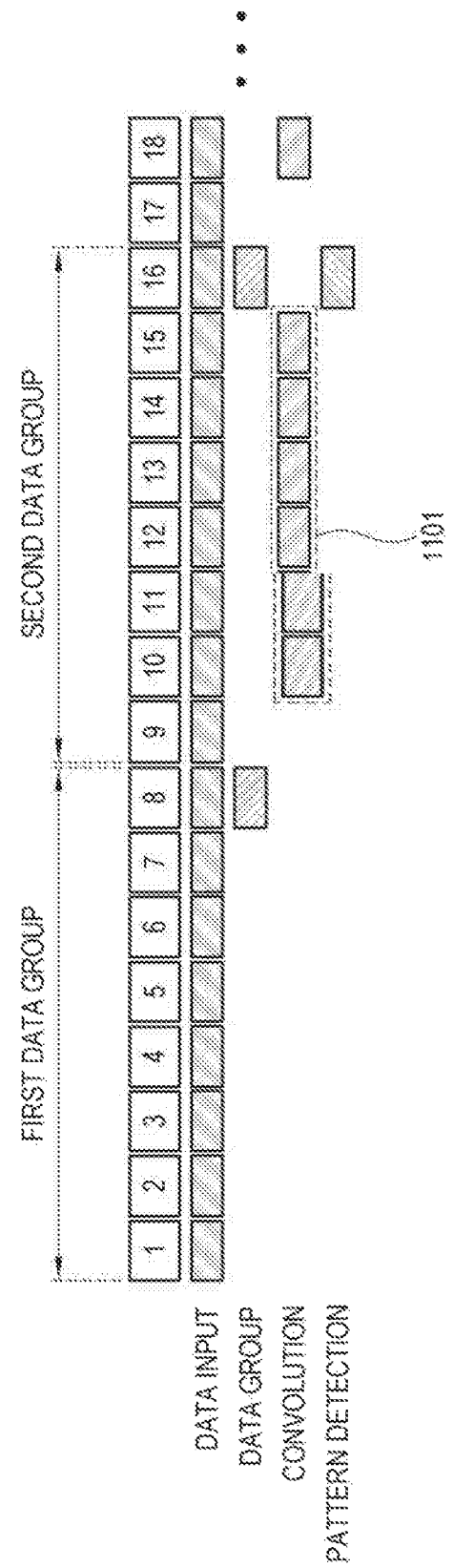
FIG. 11 illustrates that the distributed convolution is performed when data of a data group is divided in a frequency domain according to an embodiment.

FIG. 10 illustrates that the distributed convolution is performed when data of a data group is divided in a time domain according to an embodiment, and FIG. 11 illustrates that the distributed convolution is performed when data of a data group is divided in a frequency domain according to an embodiment.

According to an embodiment, in a case where the data blocks are divided according to time, the convolution is performed in real time at every frame of the data group, i.e., while the data block is input (or received).

As shown in FIG. 10, when one data group corresponds to eight frames, the audio processor 150 sequentially receives data of an audio stream of a first data group in units of frame from the first to eighth frames.

The audio processor 150 detects in real time a data block corresponding to a relevant frame at every frame in which the audio stream is input in the operation 320, and sequentially performs the convolutions according to the detected data blocks in the operation 330 (1001).

Subsequently, the audio processor 150 sequentially receives data of an audio stream of a second data group in units of frame from the ninth to sixteenth frames.

Likewise, the audio processor 150 detects in real time a data block corresponding to a relevant frame at every frame in which the audio stream is input in the operation 320, and sequentially performs the convolutions according to the detected data blocks in the operation 330 (1002)

According to an embodiment shown in FIG. 10, in which the data of the audio stream of the data group is divided in the time domain, it is possible to process the distributed convolution in real time while receiving the audio stream. However, the convolution based on a correlation between two or more different data blocks is performed in a state that data is insufficiently secured, and therefore accuracy of an operation result may be lower than that of an embodiment shown in FIG. 11.

According to an embodiment, in a case where the data blocks are divided according to frequencies, a plurality of data blocks divided from the data group is detected and the convolution is performed according to the detected data blocks when the data of the data group is fully received. Here, the convolution according to the data blocks is performed while data of a data group following this data group is received.

As shown in FIG. 11, when one data group corresponds to eight frames, the audio processor 150 sequentially receives data of an audio stream of a first data group in units of frame from the first to eighth frames.

The audio processor 150 detects a data block obtained by dividing the whole data of the first data group according to the frequencies when the data of the audio stream of the first data group is input (i.e., the first to eighth frames) in the operation 320, and sequentially performs the convolutions according to the data blocks divided from the first data group while data of an audio stream of a second data group following the first data group is input (i.e., the ninth to sixteenth frames) in the operation 330 (1101).

While the convolution is performed according to the data blocks of the first data group, the audio processor 150 sequentially receives the data of the audio stream of the second data group in units of frame from the ninth to sixteenth frames.

Likewise, the audio processor 150 detects a data block obtained by dividing the whole data of the second data group according to the frequencies when the data of the audio stream of the second data group is input (i.e., the ninth to sixteenth frames), and sequentially performs the convolutions according to the data blocks divided from the second data group while data of an audio stream of a third data group following the second data group is input (i.e., the seventeenth to twenty-fourth frames) (1101).

According to an embodiment shown in FIG. 11, in which the data of the audio stream of the data group is divided in the frequency domain, it is possible to meet with a highly reliably operation result without lowering accuracy because the data blocks are identified and the convolution based on a correlation between two or more different data blocks is performed in the state that the data of the audio stream of the first data group is fully secured in the first to eighth frames. However, latency (i.e., delay) corresponding to the whole frames of one data group may occur because the convolution is distributed and performed according to the data blocks of the first data group while the audio stream of the second data group is input. Specifically, when each frame for the data of the audio stream corresponds to 5.3 ms, a delay of about 4.2 ms occurs corresponding to one data group, but it does not give a listener inconvenience.

Referring back to FIG. 3, when the data blocks divided from each data group according to time or frequencies are sequentially subjected to a plurality of distributed convolutions in the operation 330, the audio processor 150 identifies audio features according to the data groups based on the sequentially performed operation (340).

Here, the identification of the audio feature may include merging the data blocks subjected to the convolution according to the data groups into one 2D image, and applying activation and pooling to the merged output (i.e., the image) of the data groups.

The activation refers to identification of an active value with regard to a convolution result, and identifies the active value by applying an active function to a matrix of output data (or an image or a feature map) of the data group obtained by the convolution. The output data (or image) obtained by applying the active value identified as above to the feature map is called an activation map.

The pooling is to extract a representative value from the output data (i.e., the activation map) to which the active value is reflected, and is used to reduce the size of the output data or emphasizing certain data. The pooling may operate by a method of extracting a maximum value, obtaining an average, etc. within an area of a square matrix having a predetermined size (e.g. 2×2) with regard to the output data (i.e., the activation map).

The audio processor 150 reinforces and collects the features of the data groups through the activation and the pooling, and thus identifies the corresponding audio features by detecting/identifying patterns according to the data groups as shown in FIG. 9. Thus, the output sound is given an effect corresponding to the features thereof, thereby improving satisfaction of a user.

According to an embodiment, pattern information includes a pattern of a signal, and is previously stored corresponding to various audio features in the storage 170, so that the audio processor 150 can identify the audio features according to the data groups based on comparison between the pattern determined according to the data groups and the data stored in the storage 170. Here, the audio features may be identified as one of the scene features of the video corresponding to the audio stream of the data group, for example, a human voice, music, sound effects, racing, etc. Thus, a user's immersion in a video of a TV is improved.

Further, the audio processor 150 processes the data of the audio stream so that the sound output through the audio output unit 160 corresponding to each data group can have a sound effect corresponding to the audio features identified in the operation 340 (350). Here, the audio processor 150 processes the data of the audio stream by a method of identifying a rendering parameter corresponding to the audio features, adjusting the corresponding audio equalizer or gain, or giving a rendering effect, thereby outputting the sound corresponding to the audio features.

According to the foregoing embodiments, the display apparatus 100 performs the convolution distributed k times with regard to the plurality of data blocks divided from the data of the audio stream group input in units of frame, and thus a data size required for one convolution is reduced into 1/k. Therefore, in the learning-based operation of the on-device environment, the peak operation quantity of each distributed operation is naturally decreased to distribute load, thereby preventing an operation error due to temporary overload.

Further, flexible operation design is possible so that data group identification, convolution, data block merging, activation and pooling for identifying the audio features, and the like different operations can be performed at every frame in which the audio stream is received.

As described above, in a display apparatus and a method of controlling the same according to the disclosure, operation is distributed and performed according to data blocks divided from data of an audio stream group input in units of frame, so that the peak operation quantity of each operation can be naturally decreased to distribute load, thereby preventing an operation error due to temporary overload.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:

1. A display apparatus comprising:
    a display configured to display an image;
    an audio outputter configured to output a sound; and
    a processor configured to:
    detect a plurality of data blocks divided from a data group corresponding to a predetermined number of frames with respect to data of an audio stream input frame by frame;
    sequentially perform convolution operations on each of the plurality of data blocks in a neural network using a previously learned filter;
    merge the plurality of data blocks sequentially subjected to the convolution operations for the data group;
    identify an audio feature of the data group by detecting a pattern with respect to the data group consisting of the merged plurality of data blocks based on the sequentially performed convolution operations; and
    process the data of the audio stream so that a sound output corresponding to the data group has sound effect corresponding to the identified audio feature.

2. The display apparatus according to claim 1, wherein the convolution operations are performed while each data block of the plurality of data blocks is input.

3. The display apparatus according to claim 1, wherein each data block of the plurality of data blocks corresponds to a division of data of the data group according to time.

4. The display apparatus according to claim 1, wherein each data block of the plurality of data blocks corresponds to a division of data of the data group according to frequency.

5. The display apparatus according to claim 1, wherein the processor is further configured to sequentially perform the convolution operations on each of the plurality of data blocks divided from a first data group while data of an audio stream corresponding to a second data group is input after the first data group.

6. The display apparatus according to claim 1, wherein the processor is further configured to perform the convolution operations based on a correlation between at least two different divided data blocks among the plurality of data blocks of the data group.

7. The display apparatus according to claim 1, wherein the processor is further configured to detect the pattern with respect to the data group by applying an active function to output data of the data group, and extract a representative value from the output data to which the active function is applied.

8. The display apparatus according to claim 1, wherein the audio feature corresponds to a scene feature of a video corresponding to the data of the audio stream of the data group.

9. The display apparatus according to claim 1, further comprising a storage configured to store learning data,
    wherein the processor is further configured to perform the convolution operations by applying a deep-learning algorithm model based on the learning data.

10. A method of controlling a display apparatus, comprising:
    detecting a plurality of data blocks divided from a data group corresponding to a predetermined number of frames with respect to data of an audio stream input frame by frame;
    sequentially performing convolution operations on each of the plurality of data blocks in a neural network using a previously learned filter;
    merging the plurality of data blocks sequentially subjected to the convolution operations for the data group;
    identifying an audio feature of the data group by detecting a pattern with respect to the data group consisting of the merged plurality of data blocks based on the sequentially performed convolution operations; and
    processing the data of the audio stream so that a sound output corresponding to the data group has sound effect corresponding to the identified audio feature.

11. The method according to claim 10, wherein the convolution operations are performed while each data block of the plurality of data blocks is input.

12. The method according to claim 10, wherein each data block of the plurality of data blocks corresponds to a division of data of the data group according to time.

13. The method according to claim 10, wherein each data block of the plurality of data blocks corresponds to a division of data of the data group according to frequency.

14. The method according to claim 10, wherein the sequential performing of the convolution operations comprises sequentially performing the convolution operations on each of the plurality of data blocks divided from a first data group while data of an audio stream corresponding to a second data group is input after the first data group.

15. The method according to claim 10, wherein the sequential performing of the convolution operations comprises performing the convolution operations based on a correlation between at least two different divided data blocks among the plurality of data blocks of the data group.

16. The method according to claim 10, wherein the identifying of the audio feature comprises detecting the pattern with respect to the data group by applying an active function to output data of the data group, and extracting a representative value from the output data to which the active function is applied.

17. The method according to claim 10, wherein the audio feature corresponds to a scene feature of a video corresponding to the data of the audio stream of the data group.

18. A non-transitory computer program product comprising:
- a memory configured to store a plurality of instructions; and
- a processor configured to execute the instructions to perform:
- detecting a plurality of data blocks divided from a data group corresponding to a predetermined number of frames with respect to data of an audio stream input frame by frame;
- sequentially performing convolution operations on each of the plurality of data blocks in a neural network using a previously learned filter;
- merging the plurality of data blocks sequentially subjected to the convolution operations for the data group;
- identifying an audio feature of the data group by detecting a pattern with respect to the data group consisting of the merged plurality of data blocks based on the sequentially performed convolution operations; and
- processing the data of the audio stream so that a sound output corresponding to the data group has sound effect corresponding to the identified audio feature.

* * * * *